United States Patent
Kang et al.

(10) Patent No.: US 11,424,624 B2
(45) Date of Patent: Aug. 23, 2022

(54) TRANSMITTER CIRCUIT, DATA TRANSMISSION METHOD, AND ELECTRONIC SYSTEM

(71) Applicant: SAMSUNG ELECTRONICS CO., LTD., Suwon-si (KR)

(72) Inventors: Min Hyeok Kang, Suwon-si (KR); Jun Ho Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/908,580

(22) Filed: Jun. 22, 2020

(65) Prior Publication Data
US 2021/0135465 A1  May 6, 2021

(30) Foreign Application Priority Data
Nov. 1, 2019  (KR) .................. 10-2019-0138395

(51) Int. Cl.
*H02J 7/00* (2006.01)
*G06F 13/40* (2006.01)
*G06F 13/42* (2006.01)
*G06F 1/26* (2006.01)

(52) U.S. Cl.
CPC .......... *H02J 7/00032* (2020.01); *G06F 1/266* (2013.01); *G06F 13/4022* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | |
|---|---|---|
| 5,949,254 A | 9/1999 | Keeth |
| 7,590,392 B2 | 9/2009 | Navaratnam et al. |
| 8,188,770 B2 | 5/2012 | Sakamaki |
| 8,841,971 B1* | 9/2014 | Geis ................. H03F 3/45183 330/207 P |
| 9,054,725 B1* | 6/2015 | Fest, Sr ................. H04L 12/10 |
| 9,337,807 B2 | 5/2016 | Hollis et al. |
| 9,715,263 B2 | 7/2017 | Nagase |
| 10,381,787 B1* | 8/2019 | Bodnaruk ................ H02H 3/20 |
| 10,554,140 B1* | 2/2020 | Khamesra ......... H02M 3/33592 |
| 10,651,753 B1* | 5/2020 | Khamesra ............. H02M 1/083 |
| 10,651,754 B1* | 5/2020 | Murugesan ....... H02M 3/33592 |
| 10,693,384 B1* | 6/2020 | Mondal ............ H02M 3/33592 |
| 10,910,954 B1* | 2/2021 | Shah .................... H02M 7/217 |
| 2003/0196540 A1* | 10/2003 | Ishii .................... G10H 1/0066 84/617 |

(Continued)

*Primary Examiner* — Henry Tsai
*Assistant Examiner* — Christopher A Bartels
(74) *Attorney, Agent, or Firm* — Volentine, Whitt & Francos, PLLC

(57) ABSTRACT

A transmitter circuit includes a drive circuit including; a drive circuit disposed in a first electronic device and configured to generate a setting signal and transmit the setting signal via a channel from the first electronic device to a second electronic device connected to the channel, a current source array configured to provide a current signal to the drive circuit, and a current controller configured to control the current source array, wherein the current signal provided by the current source array increases over a period extending from a first edge of the setting signal to a subsequent second edge of the setting signal.

20 Claims, 18 Drawing Sheets

(56) References Cited

U.S. PATENT DOCUMENTS

| | | | |
|---|---|---|---|
| 2004/0219893 A1* | 11/2004 | Takano | H03G 3/3047 |
| | | | 455/114.3 |
| 2007/0013411 A1 | 1/2007 | Asaduzzaman et al. | |
| 2007/0222654 A1* | 9/2007 | Vrazel | H04B 10/516 |
| | | | 341/144 |
| 2008/0266907 A1* | 10/2008 | Kim | H02M 3/33523 |
| | | | 363/21.1 |
| 2010/0172656 A1* | 7/2010 | Saitou | H04B 10/695 |
| | | | 398/202 |
| 2010/0182079 A1* | 7/2010 | Shiue | H03D 3/006 |
| | | | 329/304 |
| 2011/0028089 A1* | 2/2011 | Komori | H03F 3/245 |
| | | | 455/39 |
| 2012/0079160 A1* | 3/2012 | Iyer | G06F 13/4072 |
| | | | 710/311 |
| 2017/0195068 A1* | 7/2017 | Cho | H04B 17/13 |
| 2017/0344508 A1* | 11/2017 | Setiawan | G06F 13/4282 |
| 2018/0307289 A1* | 10/2018 | Chien | G06F 1/26 |
| 2019/0044762 A1 | 2/2019 | Lin | |
| 2019/0074063 A1* | 3/2019 | Tsubouchi | H04J 1/08 |
| 2019/0354163 A1* | 11/2019 | Bodnaruk | G06F 1/266 |
| 2020/0106412 A1* | 4/2020 | Tajalli | H03F 3/45183 |
| 2021/0056892 A1* | 2/2021 | Wei | H01L 24/48 |

\* cited by examiner

| cReceiver(pF) | Example of FIG.11(ns) | Present Embodiment(ns) |
|---|---|---|
| 630 | 145 | 231 |
| 1130 | 232 | 241 |
| 1630 | 319 | 263 |
| 2130 | 404 | 283 |
| 2630 | 495 | 310 |
| 3130 | 582 | 336 |
| 3630 | 668 | 371 |
| 4130 | 759 | 392 |

# TRANSMITTER CIRCUIT, DATA TRANSMISSION METHOD, AND ELECTRONIC SYSTEM

This application claims priority under 35 U.S.C. § 119 to Korean Patent Application No. 10-2019-0138395 filed on Nov. 1, 2019, the subject matter of which is hereby incorporated by reference.

BACKGROUND

1. Field

The inventive concept relates to a transmitter circuit, a data transmission method, and an electronic system.

2. Description of the Related Art

In the transmission of power to a universal serial bus (USB) C-type electronic device, bi-phase mark code (BMC) may be transmitted through a configuration channel (CC). BMC is includes pulses having rising edges and falling edges. When no minimum exists in rising/falling edge creation time, an electromagnetic effect may be exerted on peripheral elements or the USB C-type electronic device. In order to prevent the electromagnetic effect, a minimum edge creation time may be generated by adjusting the drive strength of a BMC drive circuit of the USB C-type electronic device.

However, as the load capacitance of a BMC receiving device increases, the edge creation time may increase, and if the edge creation time increase too much, BMC data error(s) may occur. Thus, there is a need to distribute edge creation time values within a predetermined range without data error, even with change in the load capacitance of a power consumption device.

SUMMARY

Embodiments of the inventive concept provide a transmitter circuit with a wide coverage for the load capacitor of a receiving device. Embodiments of the inventive concept also provide a data transmission method capable of widening the coverage for the load capacitor of a receiving device, and embodiments of the inventive concept also provide an electronic system with wide coverage for the load capacitor of a receiving device.

However, embodiments of the inventive concept are not restricted to only these advantages. Additional advantages and benefits will become apparent to those skilled in the art upon consideration of the subject written description and accompanying drawings in light of the related art.

According to one embodiment, there is provided a transmitter circuit including; a drive circuit disposed in a first electronic device and configured to generate a setting signal and transmit the setting signal via a channel from the first electronic device to a second electronic is device connected to the channel, a current source array configured to provide a current signal to the drive circuit, and a current controller configured to control the current source array, wherein the current signal provided by the current source array increases over a period extending from a first edge of the setting signal to a subsequent second edge of the setting signal.

According to another embodiment, there is provided a data transmission method including: connecting a first electronic device including a drive circuit and a second electronic devices via a channel, providing a clock signal and a data signal to the drive circuit, increasing a current signal provided by the drive circuit over a period extending from a first edge of a setting signal to a beginning of a subsequent second edge of the setting signal, encoding the data signal as the setting signal by reflecting the current signal and the clock signal, and transmitting the setting signal from the first electronic device to the second electronic device via the channel.

According to another embodiment, there is provided an electronic system including a power source device configured to provide power to a power consumption device via a cable, wherein the power consumption device includes a power delivery controller controlling operation of a power source. The power delivery controller includes; a current source array connected to the cable and generating a current signal, and a drive circuit configured to receive the current signal, encode a setting signal related to power provided to the power consumption device from the power source device, and transmit the encoded setting signal via a channel provided by the cable, wherein the current signal gradually increases over a period extending from a first edge of the setting signal to a second edge of the setting signal.

BRIEF DESCRIPTION OF THE DRAWINGS

The above and other features of the inventive concept will become more apparent upon consideration of embodiments thereof with reference to the attached drawings, in which.

DETAILED DESCRIPTION

Embodiments of the inventive concept will be described in some additional detail with reference to the accompanying drawings.

Electronic systems according to embodiments of the inventive concept may include a variety of electronic devices. Examples of electronic devices include, but are not limited to, mobile communication devices (e.g., smartphones), computer devices, portable multimedia devices, portable medical devices, cameras, wearable devices, and home appliances. Two or more electronic devices of the same or different type may be connected via a channel (e.g., hardwire configuration(s) and/or wireless configuration(s)) within an electronic system.

Figure 1:
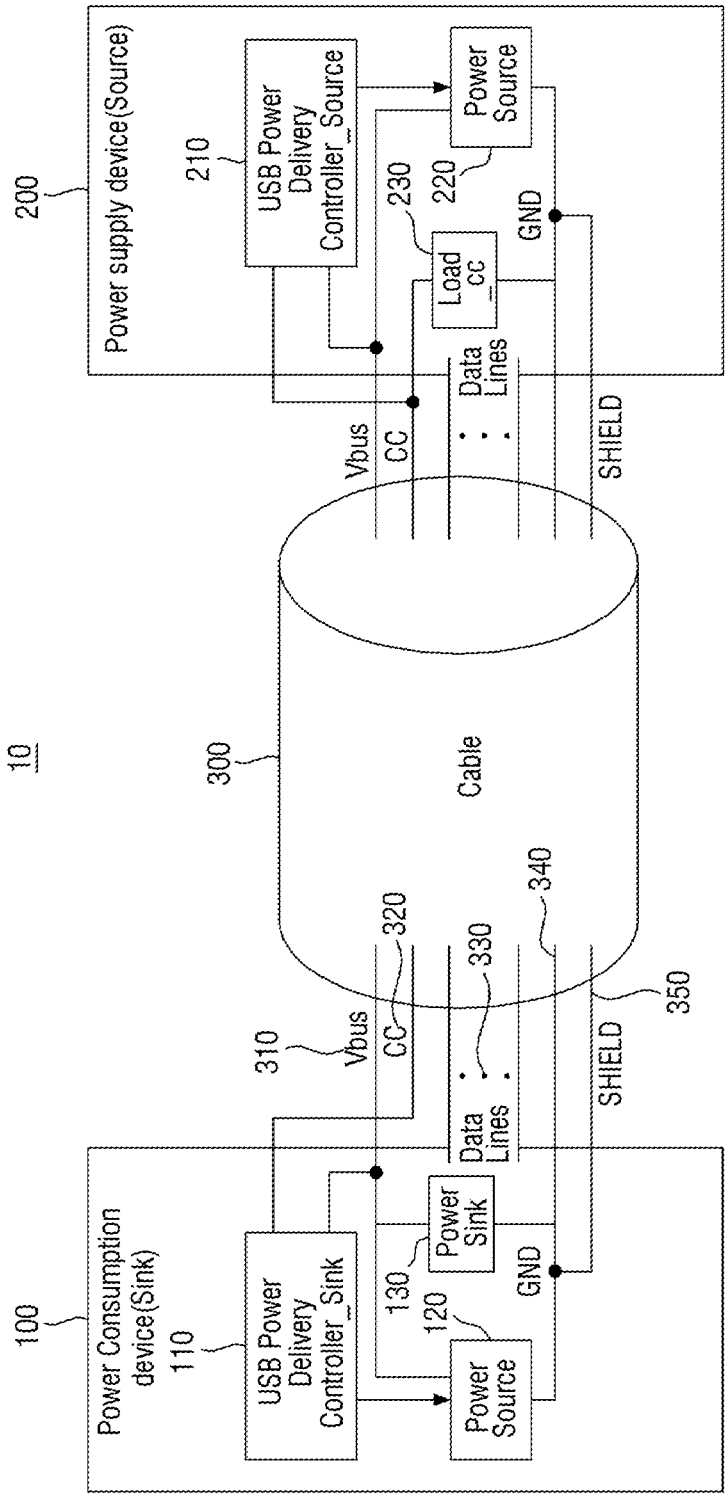
FIG. 1 is a block diagram of an electronic system according to embodiments of the inventive concept.

FIG. 1 is a block diagram of an electronic system 10 according to embodiments of the inventive concept.

The electronic system 10 of FIG. 1 is a hardwired communication system. That is, a first electronic device 100 and a second electronic device 200 are connected via one or more components (e.g., cable(s), wire(s), coupler(s), connector(s), etc.—hereafter, in any one of vast variety of possible configurations, referred to as a "channel"). Using the channel, one of the first and second electronic devices 100 and 200 may transmit a "setting signal" to the other one of the first and second electronic devices 100 and 200. In certain embodiments of the inventive concept, a setting signal may include may include a bi-phase mark code (BMC) for universal serial bus (USB) power delivery (PD). In other embodiments of the inventive concept the setting signal may include a plurality of pulses (e.g., signal components having a rising edge and/or a falling edge). However, a broad range of setting signals is contemplated by various embodiments of the inventive concept.

In FIG. 1, the first electronic device 100 may be a power consumption device (hereafter referred to as a "sink") and the second electronic device 200 may be a power supply (hereafter referred to as a "source"). In this regard, the sink 100 may be (e.g.,) a wearable electronic device, such as an earphone, a headphone, a virtual reality (VR) headset, etc., and the source 200 may be a USB charger, a travel adapter, a wall charger, etc. The hardwire connection between the sink 100 and the source 200 may be a cable 300, such that at least one power signal is transmitted between the sink 100 and source 200 via the cable 300. In certain embodiments of the inventive concept, the sink 100 and/or the source 200 may be understood as including a "transmitter circuit".

The sink 100 may include a first USB PD controller 110, a first power supply 120, and a power sink 130. The first power supply 120 and the power sink 130 may be separate device components, or they may be incorporated in a single device or system component.

The source 200 may include a second USB PD delivery controller 210, a second power source 220, and a load 230. Examples of the load 230 will be described in some additional detail hereafter.

The cable 300 may include at least one of a USB voltage bus (Vbus) 310, a configuration channel (CC) 320, data line(s) 330, a ground "GND" 340, and a shield "SHIELD" 350.

The first USB PD controller 110 and the second USB PD delivery controller 210 may communicate via the Vbus 310 and/or the CC 320 and exchange PD-related commands related to the operation of at least one of the first and second power supplies 120 and 220. Here, at least one of the first and second power supplies 120 and 220 and/or the power sink 130 may be connected between the Vbus 310 and the ground 340.

In certain embodiments of the inventive concept, the first USB PD controller 110 may transmit a setting signal including BMC (hereafter, a "BMC setting signal") to the second USB PD controller 210 via the CC 320. Then, the second USB PD controller 210 may transmit a PD-related command to the second power source 220 in response to the BMC. The second power source 220 may receive the PD-related command from the second USB PD controller 210 and may transmit power to the power sink 130 via the Vbus 310. Alternatively or additionally, the sink 100 may transmit power to the source 200 via the Vbus 310.

Figure 2:
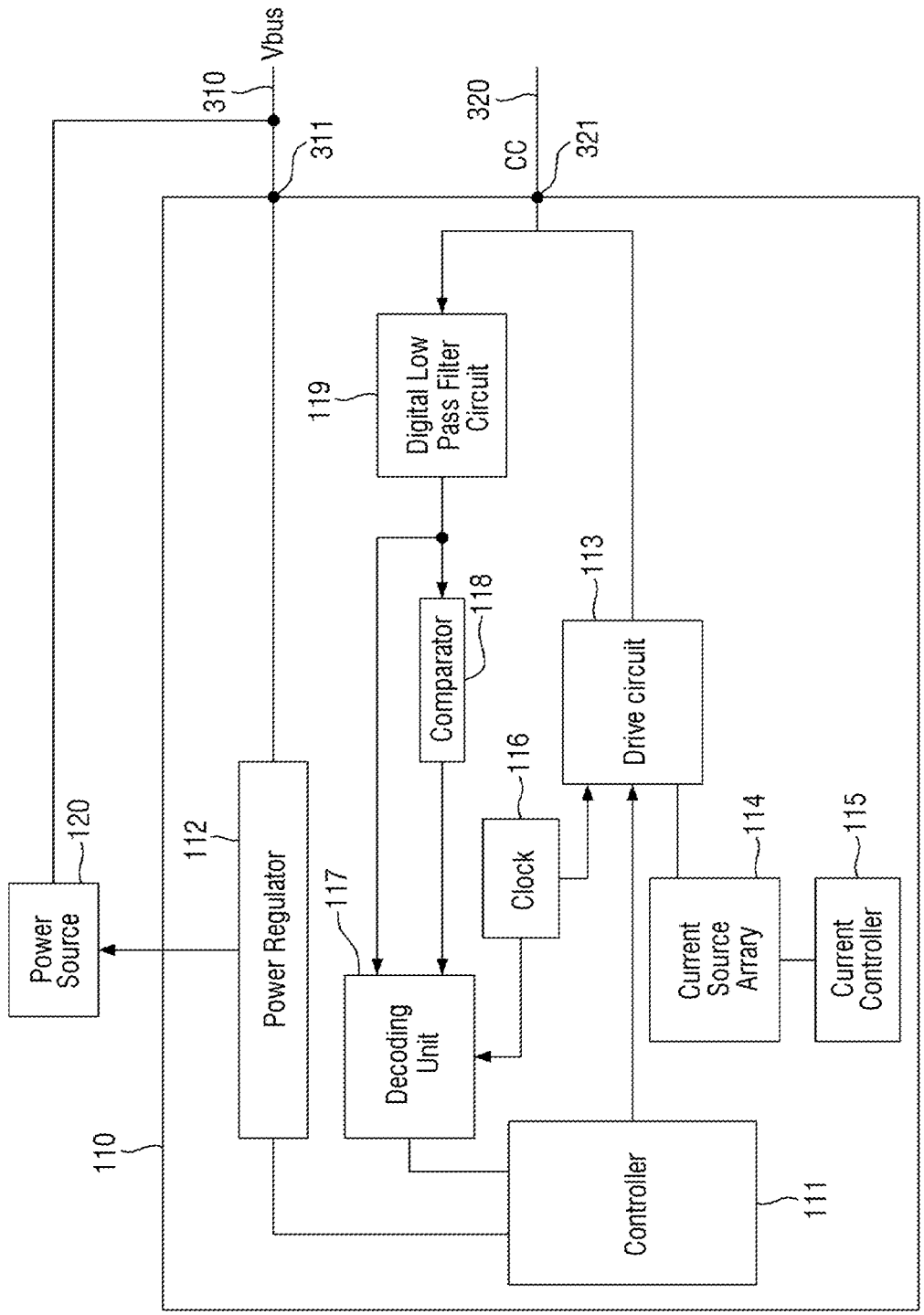
FIGS. 2 and 3 are respective block diagrams further illustrating transmitter circuits according to embodiments of the inventive concept.

FIG. 2 is a block diagram further illustrating in one example the first USB PD controller 110 of FIG. 1 in certain embodiments of the inventive concept.

Referring to FIGS. 1 and 2, the first USB PD controller 110 may include a controller 111, a power regulator 112, a drive circuit 113, a current source array 114, a current controller 115, a clock 116, a decoding unit 117, a comparator 118, and a digital low pass filter circuit 119.

The controller 111 may be connected to the power regulator 112, the drive circuit 113, and the decoding unit 117 as well as the Vbus 310 via a Vbus connector 311. In a case where the sink 100 supplies power to the source 200, the controller 111 may issue a command to the power regulator 112. In a case where the sink 100 communicates a BMC setting signal and/or a PD-related command with the power supply device 200, the controller 111 may transmit digital data via the drive circuit 113 and receive a decoded signal from the decoding unit 117.

The drive circuit 113 may be connected to the controller 111, the current source array 114, and the clock 114 as well as the CC 320 via a CC connector 321. The drive circuit 113 may encode signal(s) transmitted by the controller 111 and transmit the resulting encoded signal(s) via the CC 320. In this regard, examples of encoding of signal(s) will be described in some additional detail hereafter.

The current source array 114 may be used to control the drive strength of the drive circuit 113 by controlling a current. Alternatively or additionally, the current source array 114 may control the voltage applied to the drive circuit 113 and may include an element for applying an electrical signal to the drive circuit 113.

The current controller 114 may be used to control operation of the current source array 114 and may be included in the USB PD controller 110. Examples of the operation of the current source array 114 and the current controller 115 will be described in some additional detail hereafter.

The decoding unit 117 may be connected to the clock 116, the comparator 118, and the digital low pass filter circuit 119 as well as the CC 320 via the CC connector 321. The digital low pass filter circuit 119 may remove noise from BMC transmitted via the CC 320 in order to provide filtered BMC to the decoding unit 117 and the comparator 118. The decoding unit 117 may detect edge(s) (e.g., a rising edge and/or a falling edge) of a signal received from the comparator 118 using a clock signal received from the clock 116. In this manner, the decoding unit 117 may be used to decode the BMC using detected edge(s). Thereafter, the decoded BMC may be transmitted to the controller 111.

Figure 3:
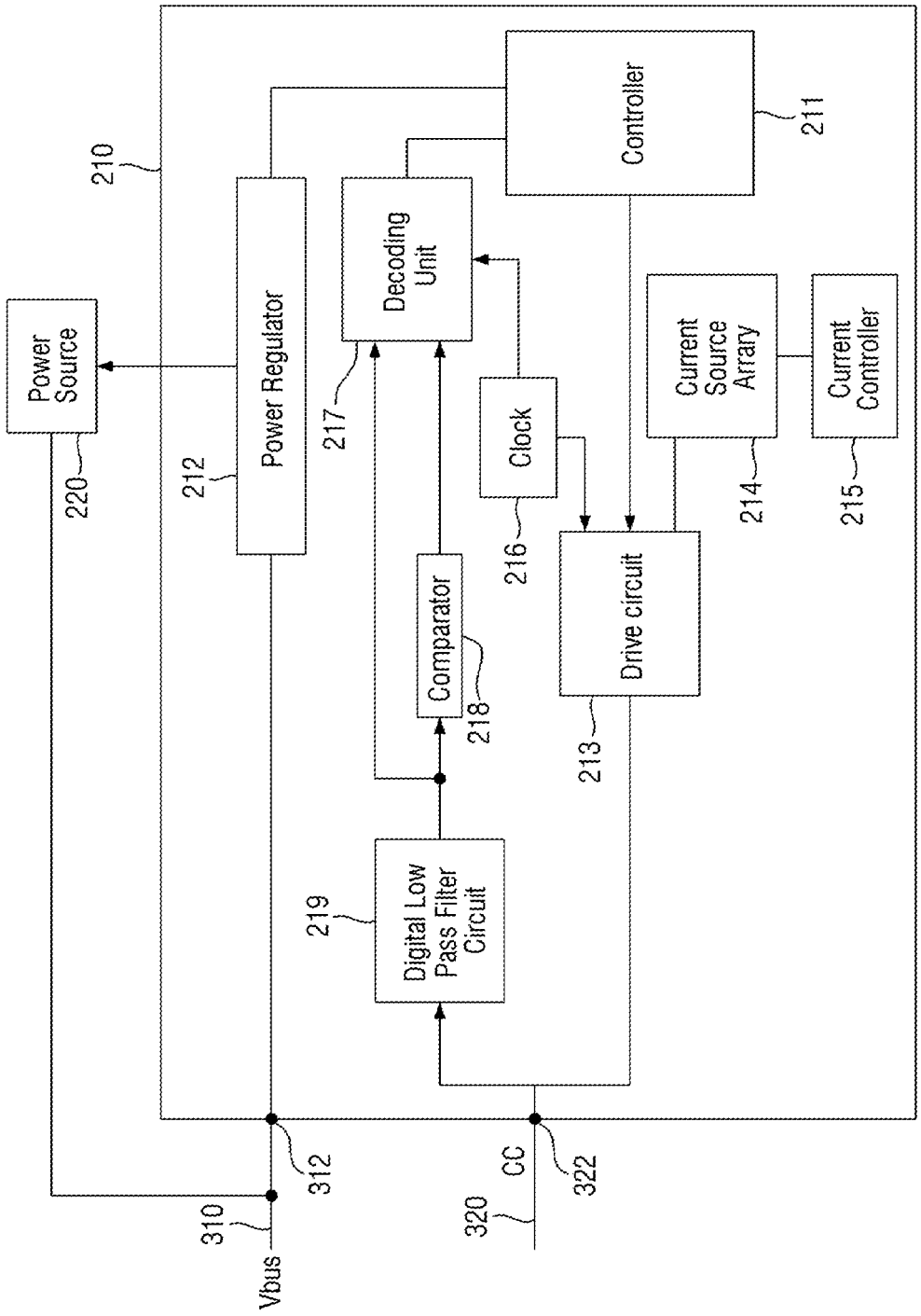

FIG. 3 is a block diagram further illustrating in one example the second USB PD controller 210 of FIG. 1 in certain embodiments of the inventive concept.

Referring to FIGS. 1, 2 and 3, the second USB PD controller 210 may include a controller 211, a power regulator 212, a drive circuit 213, a current source array 214, a current controller 215, a clock 216, a decoding unit 217, a comparator 218, and a digital low pass filter 219. Here, it should be noted that the foregoing components of the second USB PD controller 210 respectively corresponding to the controller 111, the power regulator 112, the drive circuit 113, the current source array 114, the current controller 115, the clock 116, the decoding unit 117, the comparator 118, and the digital low pass filter circuit 119 of the first USB PD controller 110. Accordingly, the controller 111 associated with the first USB PD controller 110 may be referred to as a first controller, while the controller 211 associated with the second USB PD controller 210 may be referred to as a second controller, and so on—where such further designation is necessary for clarity hereafter.

Operation of the controller 211, the voltage supply controller 212, the drive circuit 213, the current source array 214, the current controller 215, the clock 216, the decoding unit 217, the comparator 218, and the digital low pass filter 219 may be the same the respective operation of the controller 111, the power regulator 112, the drive circuit 113, the current source array 114, the current controller 115, the clock 116, the decoding unit 117, the comparator 118, and the digital low pass filter circuit 119.

Figure 4:
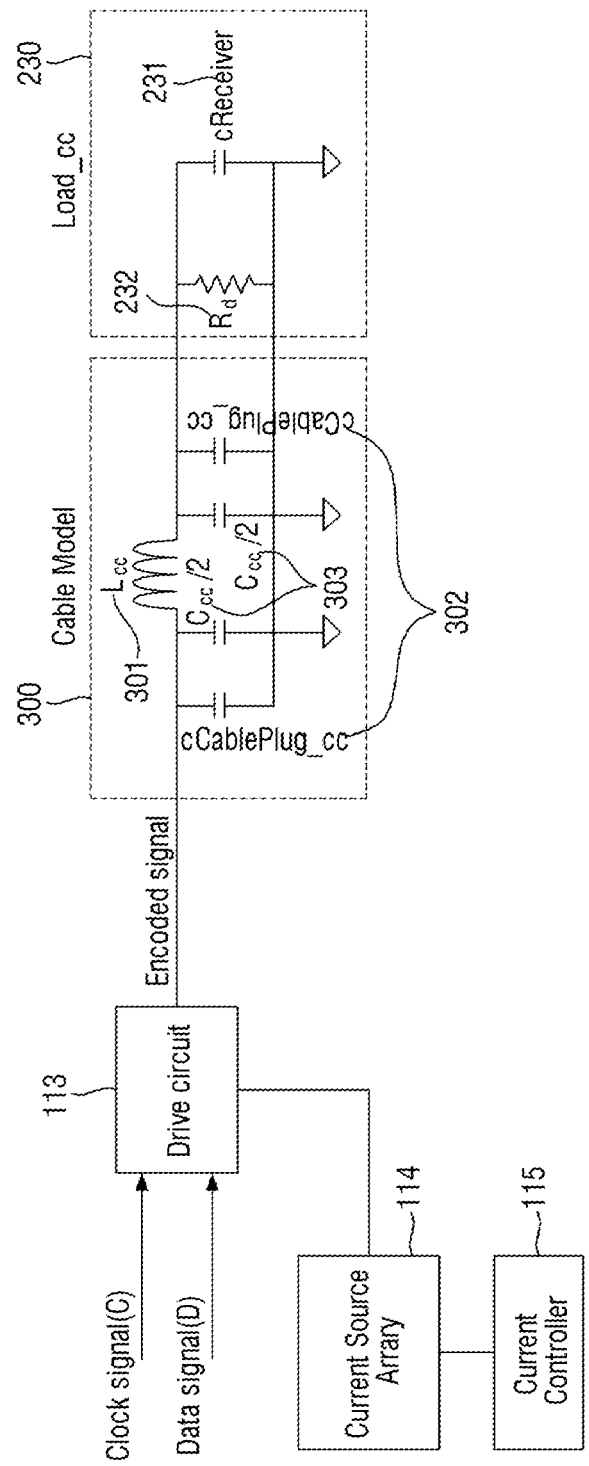
FIG. 4 is a conceptual diagram further describing the electronic system according to embodiments of the inventive concept.

FIG. 4 is a conceptual diagram further illustrating certain aspects of the electronic system 10 of FIG. 1 according to embodiments of the inventive concept.

Referring to FIGS. 1 and 4, the drive circuit 113 of the sink 10 may receive a clock signal C and a data signal D, as well as a current signal from the current source array 114 under the control of the current controller 115. In response to these input signals, the drive circuit 113 may generate an encoded signal (e.g., a BMC setting signal) and transmit the encoded signal to the load 230 of the source 200 via the cable 300.

From the perspective of the drive circuit 113, the cable 300 and the load 230 may be modeled as a combination of resistor(s), capacitor(s), and/or coil(s). Here, the cable 300 may be modeled with a symmetrical structure due to the characteristics of the CC 320 which is directly connected to the drive circuit 113.

For example, the cable 300 may be modeled as including capacitors "cCablePlug_cc" 302 which reflect the CC connector 321 of FIG. 2, a coil "$L_{cc}$" 301, and capacitors "$C_{cc}$" 303 which reflect the CC 320 of the cable 300.

From the perspective of the drive circuit 113, the load 230, which models the source 200 may include a capacitor "cReceiver" 231 and a resistor "$R_d$" 232 connected in parallel between is the drive circuit 113 and the ground "GND" 340. That is, in the cable model of FIG. 4, the drive circuit 113 may be understood as being connected to the capacitor "cReceiver" 231 via the coil "$L_{cc}$" 301. Thus, the drive circuit 113 may be affected by the capacitance of the capacitor "cReceiver" 231.

Figure 5:
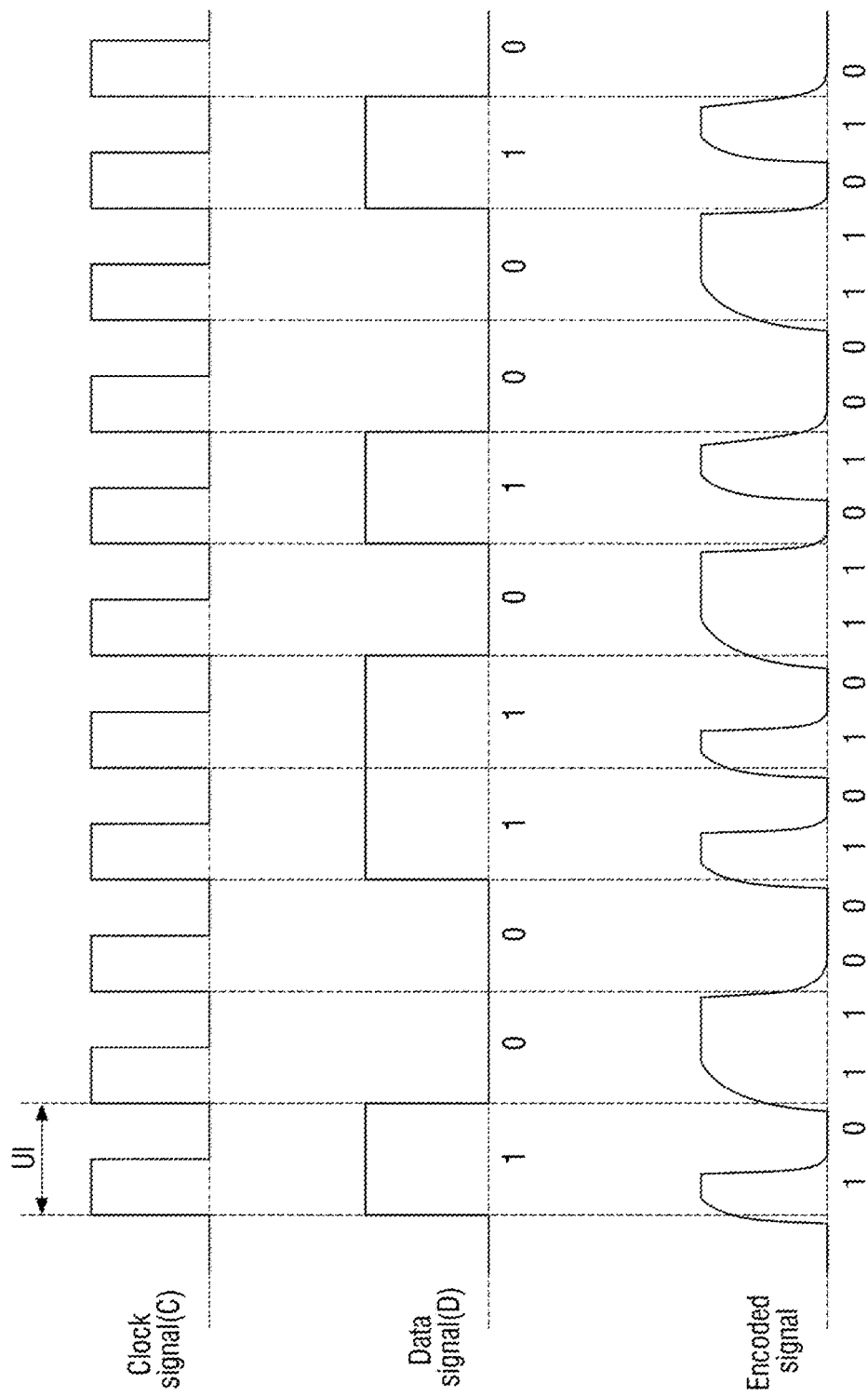
FIG. 5 is a waveform diagram illustrating certain signals related to the operation of a drive circuit according to embodiments of the inventive concept.

FIG. 5 is a waveform diagram of certain signals described above in relation to the encoding of BMC by a drive circuit according to embodiments of the inventive concept.

That is, FIG. 5 illustrates a signal encoded by reflecting an adjustment in the drive strength of the drive circuit 113, but not a delay caused by input to, and output from, the drive circuit 113. However, the inventive concept is not limited to the specific signal illustrated in FIG. 5.

Referring to FIGS. 4 and 5, a signal encoded with BMC (e.g., a BMC setting signal) may be obtained by modulating the clock signal C and the data signal D. Thus, the source 200 may receive both the clock signal C and the data signal D at the same time, where a unit interval (UI) for the data signal D may be twice the unit interval of the clock signal C.

Each bit of the data signal D may be represented as one of two possible logic states (e.g., "0" and "1"). If the data signal D is "1", an encoded signal may be output as a string of different bits (i.e., 10 or 01) depending on its previous value. If the data signal D is "0", the encoded signal may be output as a string of same bits (i.e., 00 or 11).

That is, when the data signal D is "1", there are two signal changes, per clock, in the encoded signal. On the other hand, when the data signal D is "0", there is only signal change, per clock, in the encoded signal. This type of BMC encoding may be similar to differential Manchester encoding.

If the encoded signal changes from "1" to "0" or "0" to "1", the data signal D may have a value of "1". If the value of the encoded signal does not change, the data signal D may have a is value of "0". Thus, the source 200 can easily extract the clock signal C. If "1" or "0" bits are consecutively generated, asynchronism may arise. However, since BMC provides at least one zero crossing in 2-bit data, an asynchronism issue in serial communication can be avoided.

The drive circuit 113 reflects an adjustment in drive strength so that when there is a signal change in the clock signal C, there may exist rising/falling time at each edge of the encoded signal. That is, when there is a signal change (or a rising edge) from "0" to "1" in the encoded signal, the rising time may be consumed, and when there is a signal change (or a falling edge) from "1" to "0" in the encoded signal, the falling time may be consumed.

Figure 6:
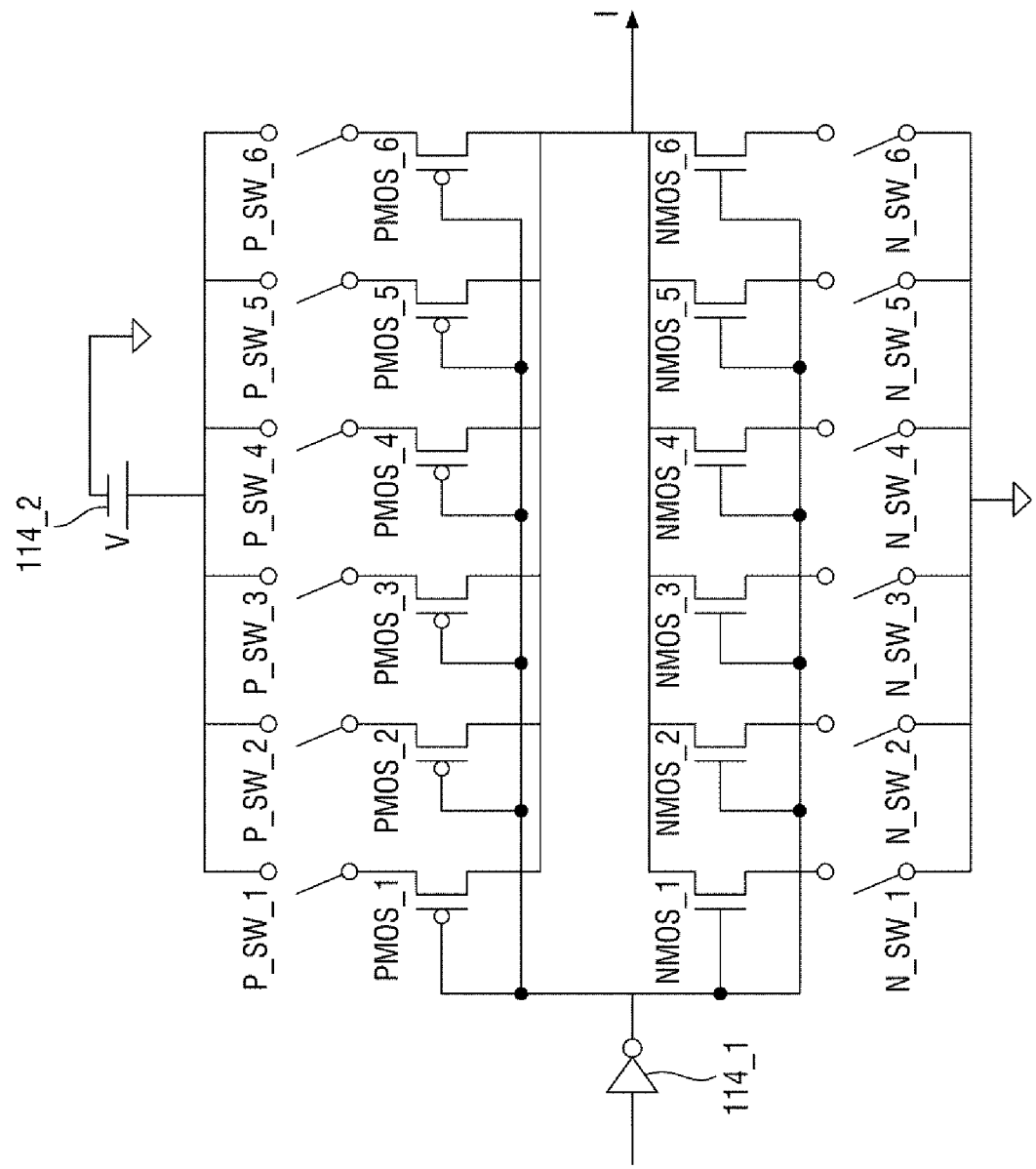
FIG. 6 is a circuit diagram illustrating one possible structure for a current source array according to embodiments of the inventive concept.

FIG. 6 illustrates one possible structure for the current source array 114 (or 214) of FIGS. 2 and 3 that may be used in certain embodiments of the inventive concept.

Referring to FIGS. 2 and 6, the current source array 114 may include an inverter 114_1, a power supply voltage 114_2, first, second, third, fourth, fifth, and sixth P-type transistors PMOS_1, PMOS_2, PMOS_3, PMOS_4, PMOS_5, and PMOS_6, first, second, third, fourth, fifth, and sixth P switches P_SW_1, P_SW_2, P_SW_3, P_SW_4, P_SW_5, and P_SW_6, which are connected in series to the first, second, third, fourth, fifth, and sixth P-type transistors PMOS_1, PMOS_2, PMOS_3, PMOS_4, PMOS_5, and PMOS_6, respectively, first, second, third, fourth, fifth, and sixth N-type transistors NMOS_1, NMOS_2, NMOS_3, NMOS_4, NMOS_5, and NMOS_6, and first, second, third, fourth, fifth, and sixth N switches N_SW_1, N_SW_2, N_SW_3, N_SW_4, N_SW_5, and N_SW_6, which are connected in series to the first, second, third, fourth, fifth, and sixth N-type transistors NMOS_1, NMOS_2, NMOS_3, NMOS_4, NMOS_5, and NMOS_6, respectively.

The inverter 114_1 may be connected to the gates of the first, second, third, fourth, fifth, and sixth P-type transistors PMOS_1, PMOS_2, PMOS_3, PMOS_4, PMOS_5, and PMOS_6 and to the gates of the first, second, third, fourth, fifth, and sixth N-type transistors NMOS_1, NMOS_2, NMOS_3, NMOS_4, NMOS_5, and NMOS_6.

Second ends of the first, second, third, fourth, fifth, and sixth P switches P_SW_1, P_SW_2, P_SW_3, P_SW_4, P_SW_5, and P_SW_6 may be connected to the power supply voltage 114_2, and the first, second, third, fourth, fifth, and sixth P switches P_SW_1, P_SW_2, P_SW_3, P_SW_4, P_SW_5, and P_SW_6 and the first, second, third, fourth, fifth, and sixth P-type transistors PMOS_1, PMOS_2, PMOS_3, PMOS_4, PMOS_5, and PMOS_6 may be connected in parallel between the power supply voltage 114_2 and an output node.

Second ends of the first, second, third, fourth, fifth, and sixth N switches N_SW_1, N_SW_2, N_SW_3, N_SW_4, N_SW_5, and N_SW_6 may be connected to ground, and the first, second, third, fourth, fifth, and sixth N switches N_SW_1, N_SW_2, N_SW_3, N_SW_4, N_SW_5, and N_SW_6 and the first, second, third, fourth, fifth, and sixth N-type transistors NMOS_1, NMOS_2, NMOS_3, NMOS_4, NMOS_5, and NMOS_6 may be connected in parallel between the output node and ground.

Figure 7:
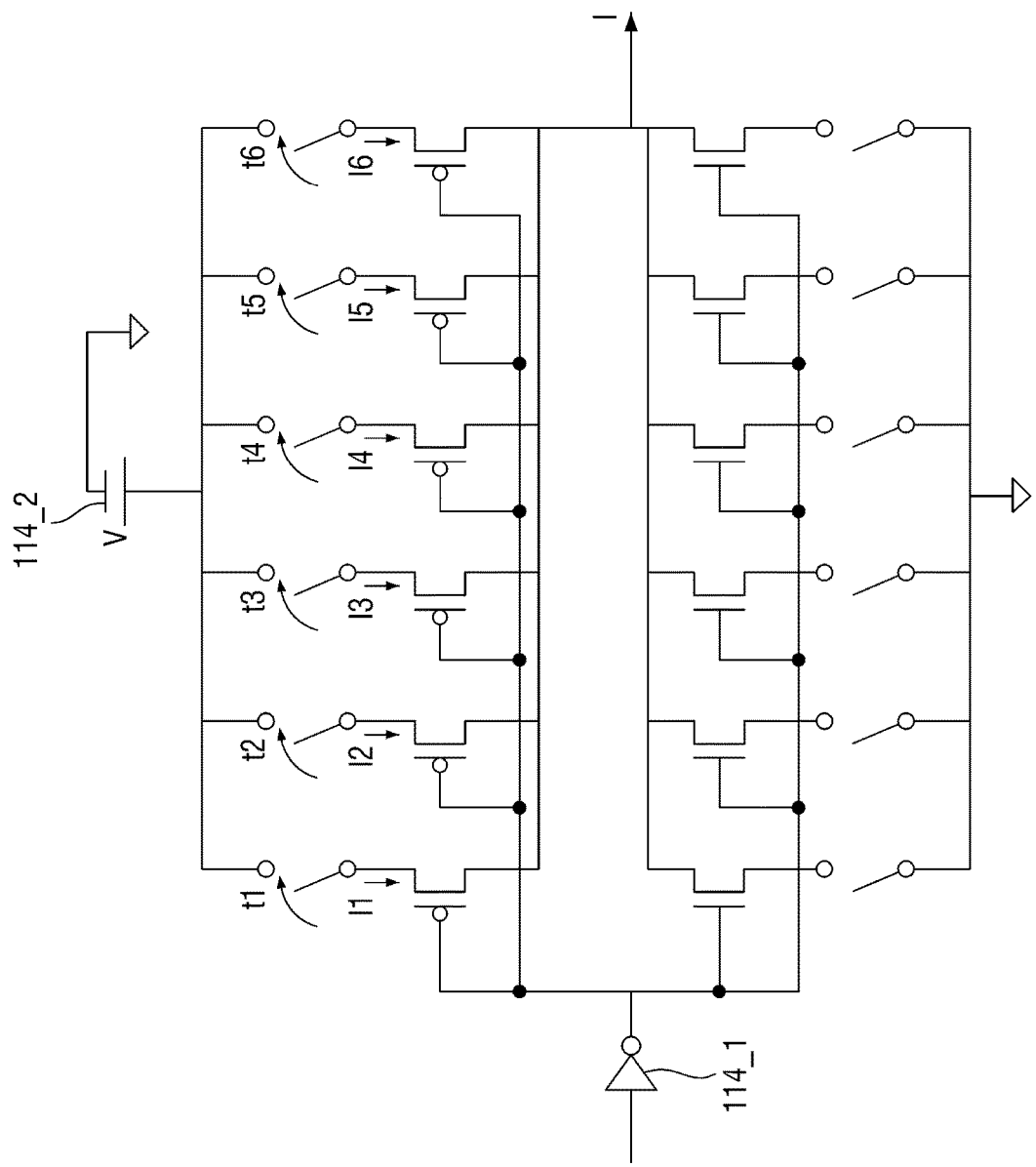
FIGS. 7 and 8, as well as FIGS. 9 and 10, are diagrams further illustrating operation of the current source array and a current controller of FIG. 6.
Figure 8:
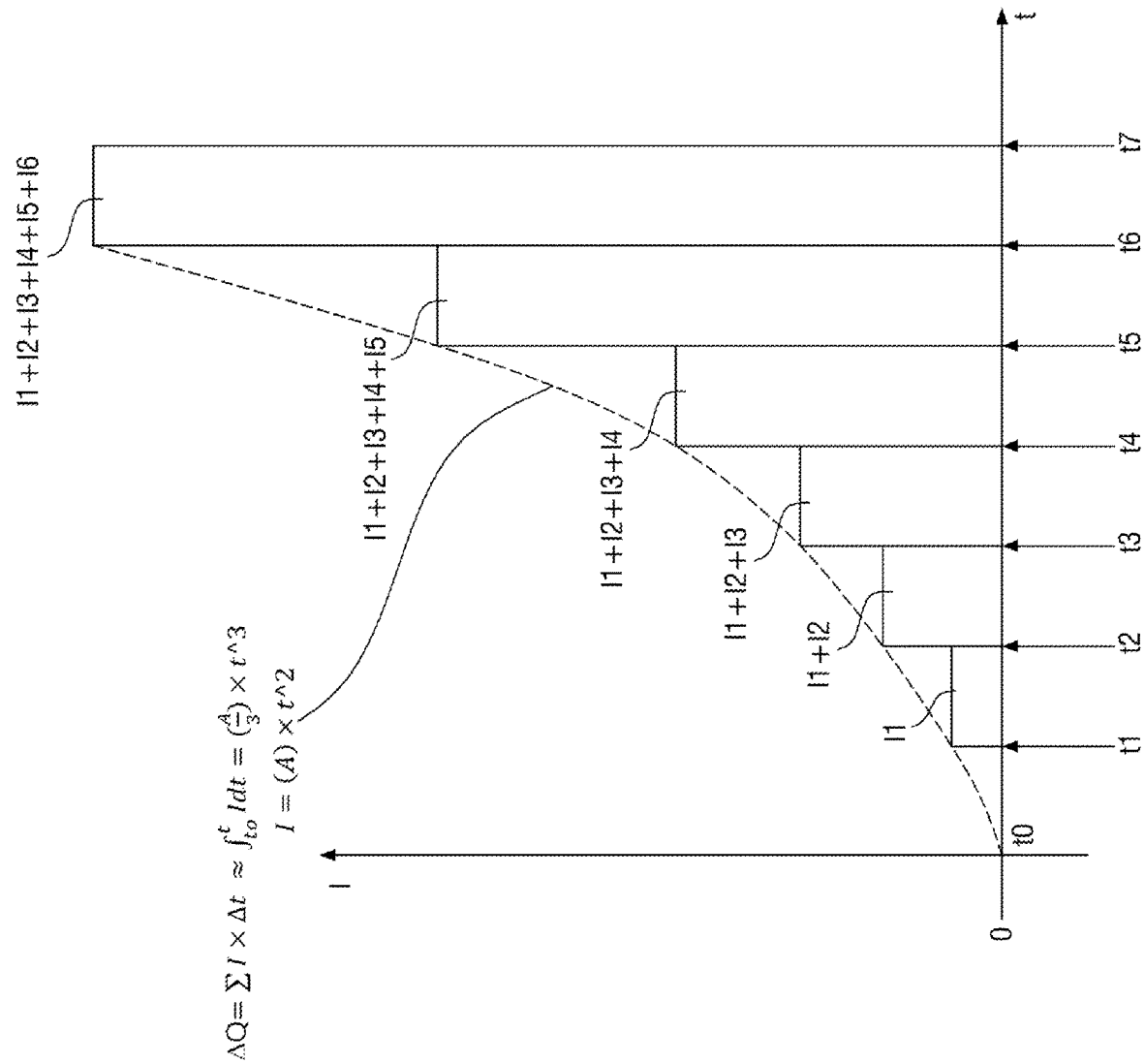

FIGS. 7 and 8 collectively illustrate operation of the current source array 114 of FIG. 6 according to embodiments of the inventive concept.

Referring to FIGS. 6, 7, and 8—at time t0, a signal with a value of "1" is transmitted to the inverter 114_1 and is assumed to be the beginning of a BMC rising edge. The value of "1" may be converted into a value of "0" by the inverter 114_1, and the value of "0" may arrive at the gates of the first, second, third, fourth, fifth, and sixth P-type transistors PMOS_1, PMOS_2, PMOS_3, PMOS_4, PMOS_5, and PMOS_6.

Referring further to FIGS. 6, 7, and 8 along with FIG. 2, the first, second, third, fourth, fifth, and sixth P switches P_SW_1, P_SW_2, P_SW_3, P_SW_4, P_SW_5, and P_SW_6 may be closed by the current controller 115 at times t1, t2, t3, t4, t5, and t6 (where t1<t2<t3<t4<t5<t6).

A current "I" is I1 during a period [t1, t2], I1+I2 during a period [t2, t3], I1+I2+I3 during a period [t3, t4], I1+I2+I3+I4 during a period [t4, t5], I1+I2+I3+I4+I5 during a period [t5, t6], and I1+I2+I3+I4+I5+I6 during a period [t6, t7].

The times t1, t2, t3, t4, t5, and t6 and the current I at each of the times t1, t2, t3, t4, t5, and t6 may satisfy Equation (1):

$$I = A \times t^2 (A>0) \qquad (1).$$

If the current I satisfies Equation (1), an amount |I| of the current I may increase with time, in the form of a quadratic curve, and an increase Δ|I| in the current amount |I| may increase linearly with time.

Thus, a charge variation ΔQ, which may affect the encoded signal from the drive circuit 113, may be as indicated by Equation (2):

$$\Delta Q = \sum I \times \Delta t \approx \int_{t0}^{t} I dt = \left(\frac{A}{3}\right) \times t^3 (A>0). \qquad (2)$$

If the charge variation ΔQ satisfies Equation (2), the charge variation ΔQ may increase with time, in the form of a cubic curve.

Figure 9:
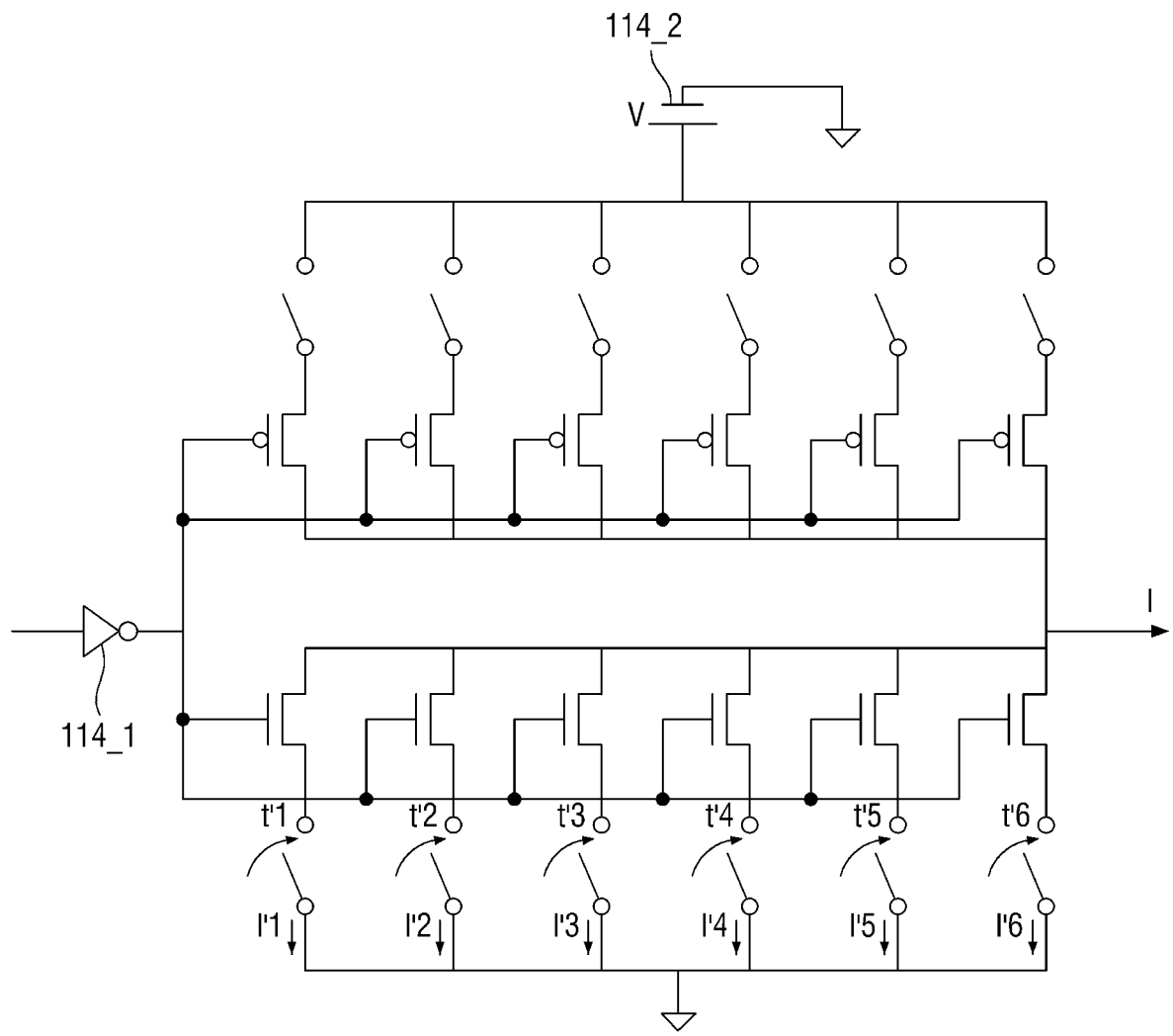
Figure 10:
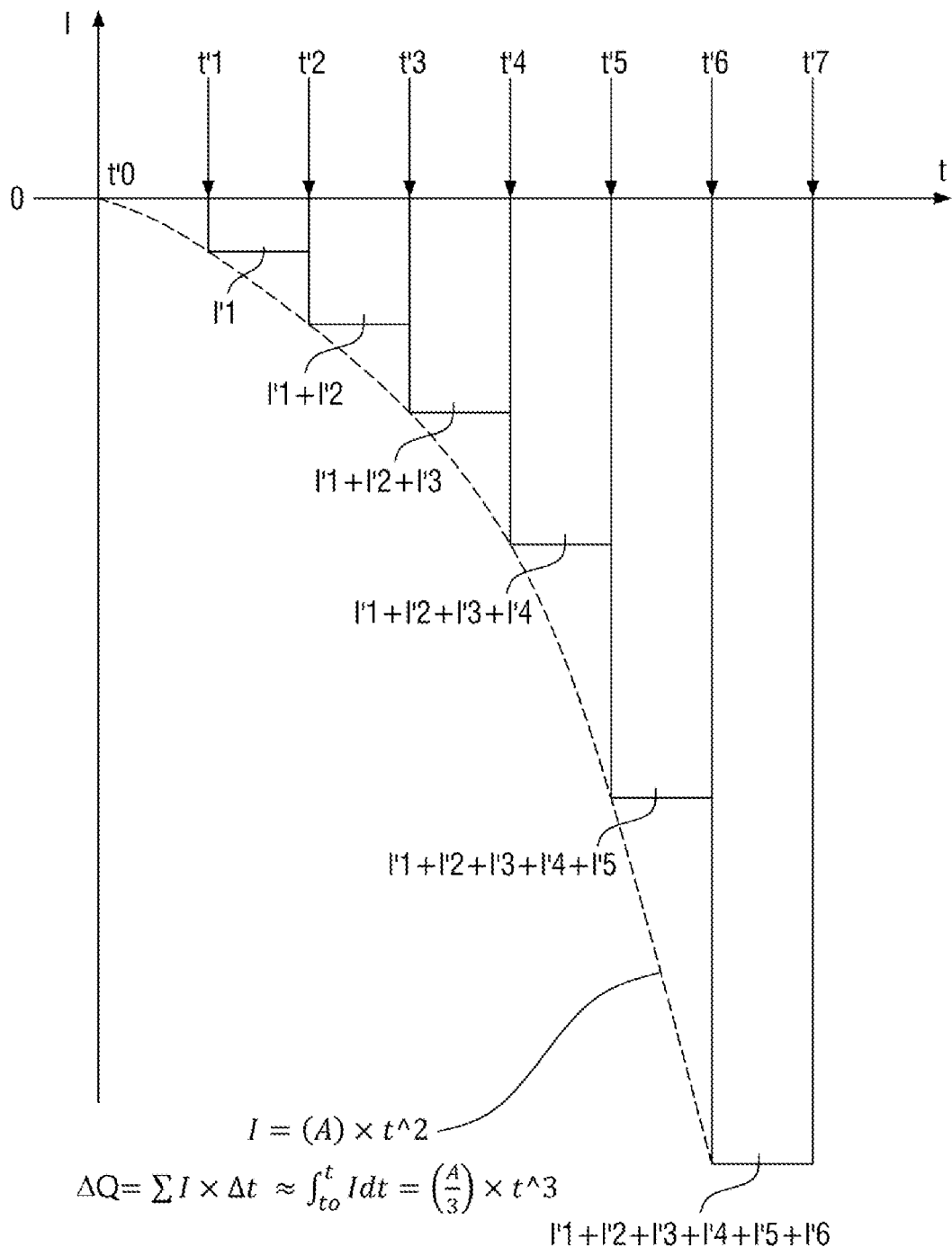

FIGS. 9 and 10 collectively illustrate operation of the current source array 114 of FIG. 6 according to embodiments of the inventive concept.

Referring to FIGS. 6, 9, and 10—at time C0 a value of "0" is transmitted to the inverter 114_1 and is assumed to be the beginning of a BMC falling edge. The value of "0" may be converted into a value of "1" by the inverter 114_1, and the value of "1" may arrive at the gates of the first, second, third, fourth, fifth, and sixth N-type transistors NMOS_1, NMOS_2, NMOS_3, NMOS_4, NMOS_5, and NMOS_6.

Referring further to FIGS. 6, 9 and 10 along with FIG. 2, the first, second, third, fourth, fifth, and sixth N switches N_SW_1, N_SW_2, N_SW_3, N_SW_4, N_SW_5, and N_SW_6 is may be closed by the current controller 115 at times t'1, t'2, t'3, t'4, t'5, and t'6 (where t'1<t'2<t'3<t'4<t'5<t'6).

The current I is I'1 during a period [t'1, t'2], I'1+I'2 during a period [t'2, t'3], I'1+I'2+I'3 during a period [t'3, t'4], I'1+I'2+I'3+I'4 during a period [t'4, t'5], I'1+I'2+I'3+I'4+I'5 during a period [t'5, t'6], and I'1+I'2+I'3+I'4+I'5+I'6 during a period [t'6, t'7]. The times t'1, t'2, t'3, t'4, t'5, and t'6 and the current I at each of the times t'1, t'2, t'3, t'4, t'5, and t'6 may satisfy Equation (3):

$$I = A \times t^2 (A<0) \qquad (3).$$

If the current I satisfies Equation (1), the current amount |I| may increase with time, in the form of a quadratic curve, and the increase Δ|I| in the current amount |I| may increase linearly with time.

Thus, the charge variation ΔQ, which may affect the encoded signal from the drive circuit 113, may be as indicated by Equation (4):

$$\Delta Q = \sum I \times \Delta t \approx \int_{t'0}^{t} I dt = \left(\frac{A}{3}\right) \times t^3 (A<0). \qquad (4)$$

If the charge variation ΔQ satisfies Equation (4), the charge variation ΔQ may increase with time, in the form of a cubic curve.

Figure 11:
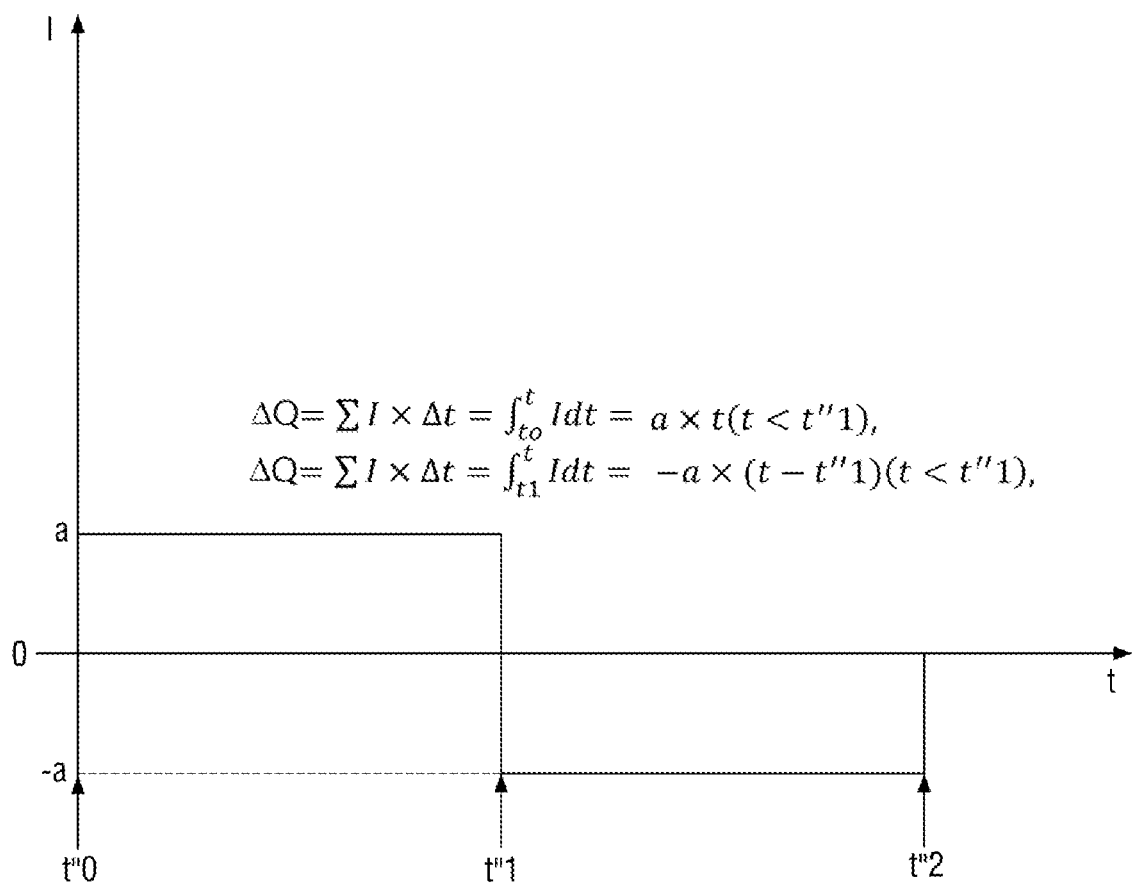
FIG. 11 is a graph illustrating the operation of a comparative transmitter circuit.

FIG. 11 is a graph illustrating, by way of a comparative example, the operation of a transmitter circuit different from transmitter circuits according to embodiments of the inventive concept (hereafter, "the comparative transmitter").

Referring to FIG. 11, the current drive strength of a BMC drive circuit of the comparative transmitter is uniform.

So, if times t"0 and t"1 are respectively the beginnings of BMC rising and falling edges, is a time t"2 may be the beginning of a subsequent BMC rising edge. A current I during a period [t"0, t"2] may satisfy Equations (5) and (6) for different ranges of time (t):

$$I = a(t<t''1), (\alpha>0) \qquad (5); \text{ and}$$

$$I = -a(t''1<t<t''2), (\alpha>0) \qquad (6).$$

The amount of the current I is uniform throughout a period from the beginning of one edge to the beginning of a subsequent edge.

Thus, a charge variation ΔQ, which may affect an encoded signal from the drive circuit 113, may be represented by Equations (7) and (8) for different ranges of time (t):

$$\Delta Q = \sum I \times \Delta t \approx \int_{t''0}^{t} I dt = a \times t, (t<t''1)(a>0); \text{ and} \qquad (7)$$

$$\Delta Q = \sum I \times \Delta t \approx \int_{t''1}^{t} I dt = -a \times (t-''1), (t''1<t<t''2)(a>0). \qquad (8)$$

According to Equations (7) and (8), the charge variation ΔQ may increase linearly with time.

Figure 12:
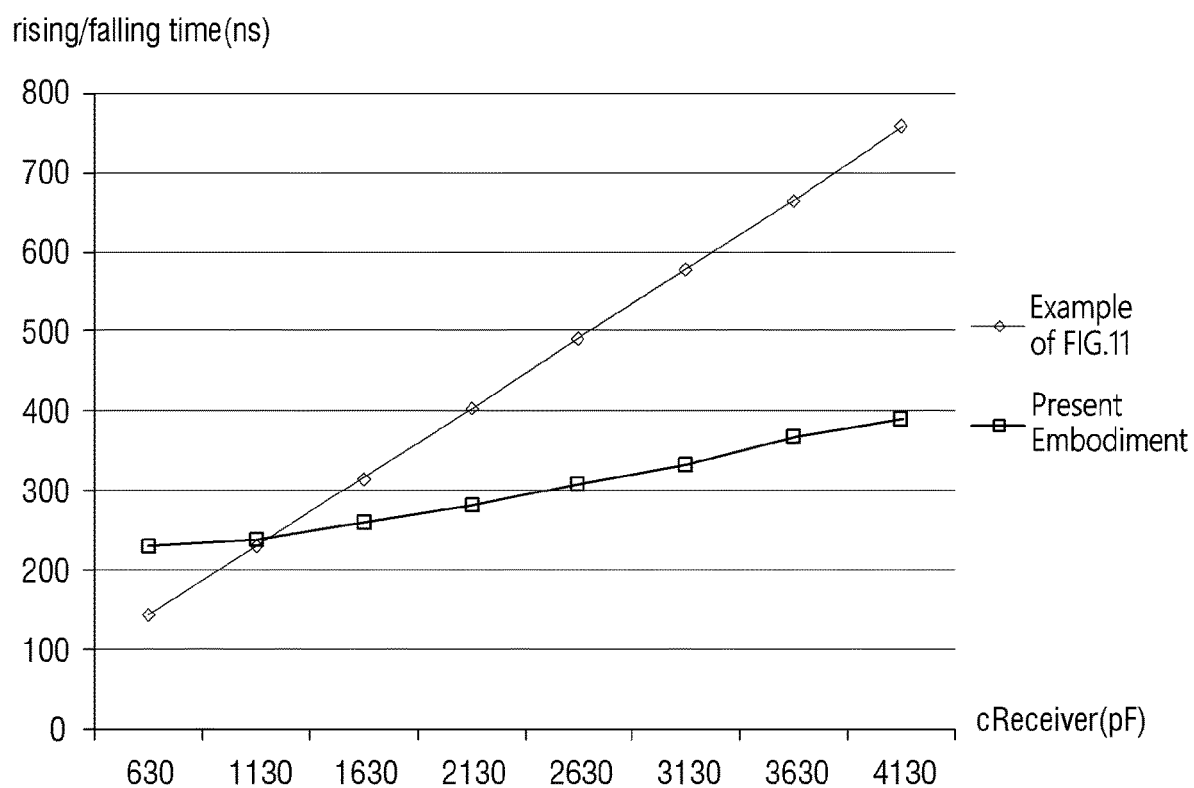
FIG. 12 is a chart and related graph illustrating certain benefits of the current source array according to embodiments of the inventive concept.

FIG. 12 is a chart and a graph plot further illustrating certain comparative benefits of certain embodiments of the inventive concept.

Specifically, FIG. 12 compares the rising/falling time of the transmitter circuit according to the embodiment of FIG. 10 (hereinafter, the "present embodiment") and the rising/falling time of the comparative transmitter circuit of FIG. 11 for various capacitances of the capacitor "cReceiver" 231.

Referring to FIG. 12, in relation to the present embodiment, as the capacitance of the capacitor "cReceiver" 231 changes from 630 pF to 1130 pF to 1630 pF to 2130 pF to 2630 pF to 3130 pF to 3630 pF to 4130 pF, BMC rising/falling time may change from 231 ns to 241 ns to 263 ns to 283 ns to 310 ns to 336 ns to 371 ns to 392 ns.

In relation to the comparative transmitter (Example of FIG. 11), as the capacitance of the capacitor "cReceiver" 231 changes from 630 pF to 1130 pF to 1630 pF to 2130 pF to 2630 pF to 3130 pF to 3630 pF to 4130 pF, BMC rising/falling time may change from 145 ns to 232 ns to 319 ns to 404 ns to 495 ns to 582 ns to 668 ns to 759 ns.

Thus, in the present embodiment, as the capacitance of the capacitor "cReceiver" 231 increases about seven times from 630 pF to 4130 pF, rising/falling time increases less than two times from 231 ns to 392 ns. In contrast, in the comparative transmitter (Example of FIG. 11), as the capacitance of the capacitor "cReceiver" 231 increases about seven times from 630 pF to 4130 pF, rising/falling time increases more than five times from 145 ns to 759 ns. Accordingly, in the present embodiment, unlike in the comparative transmitter (Example of FIG. 11), the rising/falling time can only change within a predetermined range, regardless of changes in the capacitance of the capacitor "cReceiver" 231.

Referring further to FIGS. 8 and 10 along with FIG. 11, in the embodiment of FIGS. 8 and 10, the charge variation ΔQ increases with time along a cubic curve. In contrast, in the comparative transmitter (Example of FIG. 11), the charge variation ΔQ increases with time in a straight line.

Thus, in the embodiment of FIGS. 8 and 10, as rising/falling time increases, the speed at which the capacitor "cReceiver" 231 is charged or discharged is increased. However, in the comparative transmitter (Example of FIG. 11), since the speed at which the capacitor "cReceiver" 231 is charged or discharged is uniform regardless of an increase in rising/falling time, the amount by which the rising/falling time varies in response to a capacitance change in the capacitor "cReceiver" 231 may be relatively large.

Figure 13:
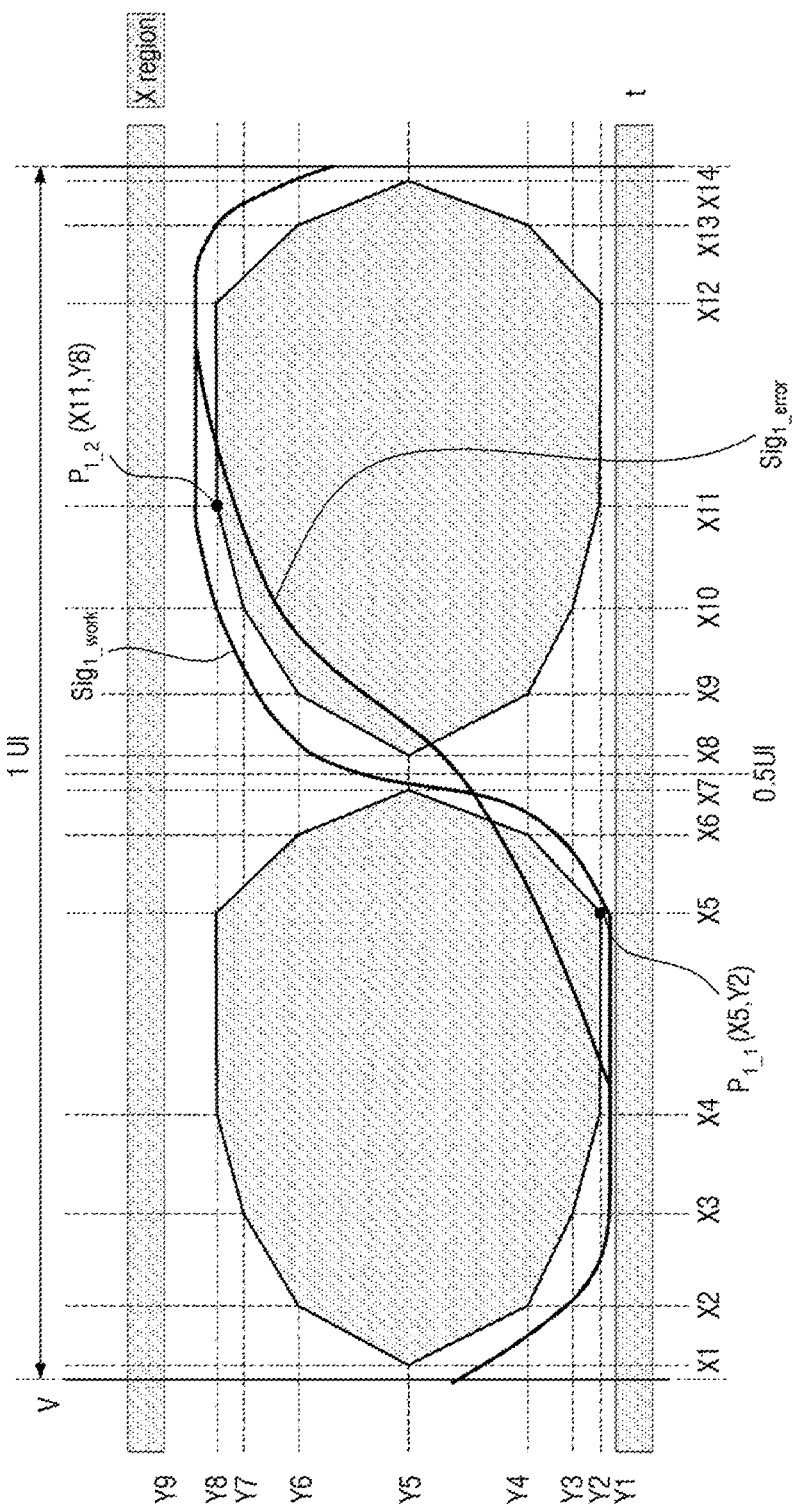
FIGS. 13 and 14 are diagram illustrating conditions under which bi-phase mark code (BMC) operates.

FIG. 13 is a diagram illustrating conditions under which BMC operates.

Referring to FIGS. 2, 5, 12, and 13, in order for encoded BMC to properly indicate that a data signal D is "1", an encoded signal cannot pass through an "X region", as indicated by $Sig1_{\_work}$. If an encoded signal passes through the "X region", as indicated by $Sig1_{\_error}$, the is data signal D cannot be represented as being "1".

Thus, in a case where BMC rises, in order not to pass through the "X region", the rising time needs to be less than X11–X5 when the electric potential of the BMC rises from Y2 to Y8. Also, the electric potential of the BMC cannot be raised from Y2 to Y8 within an excessively short period of time in consideration that the drive circuit 113 can be affected electromagnetically.

If X11–X5=400 ns and the capacitance of the capacitor "cReceiver" 231 is 2130 pF or greater, the BMC signal of FIG. 10 cannot operate properly.

Figure 14:
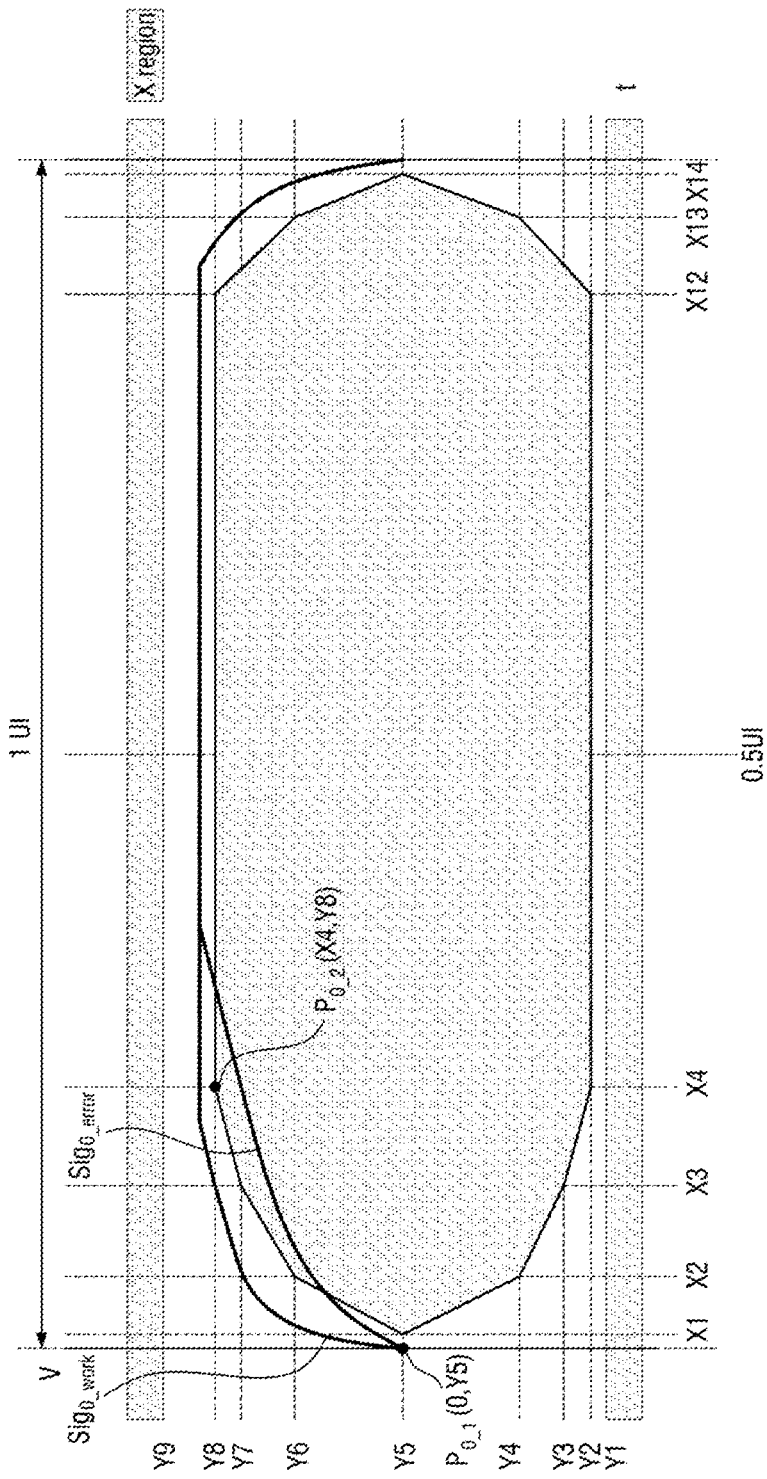

FIG. 14 is a diagram illustrating conditions for operating BMC.

Referring to FIGS. 2, 5, 12, and 14, in order for encoded BMC to properly indicate that a data signal D is "0", an encoded signal cannot pass through an "X region", as indicated by $Sig0_{\_work}$. If an encoded signal passes through the "X region", as indicated by $Sig0_{\_error}$, the data signal D cannot be represented as being "0".

Thus, in a case where BMC rises, in order not to pass through the "X region", the rising time needs to be less than X4 when the electric potential of the BMC rises from Y5 to Y8. Also, the electric potential of the BMC cannot be raised from Y5 to Y8 within an excessively short period of time in consideration that the drive circuit 113 can be affected electromagnetically.

If X4 is 400 ns and the capacitance of the capacitor "cReceiver" 231 is 2130 pF or greater, the BMC signal of FIG. 11 cannot operate properly.

Thus, it may be understood that the drive circuit 113 of FIG. 10 has a wider coverage than the drive circuit of FIG. 11 for the capacitor "cReceiver" 231 of the power supply device 200.

The graphs of FIGS. 13 and 14 are merely exemplary, and the inventive concept is not limited thereto. Wired communication using a plurality of pulse signals may also be is encompassed within the scope of the inventive concept.

Figure 15:
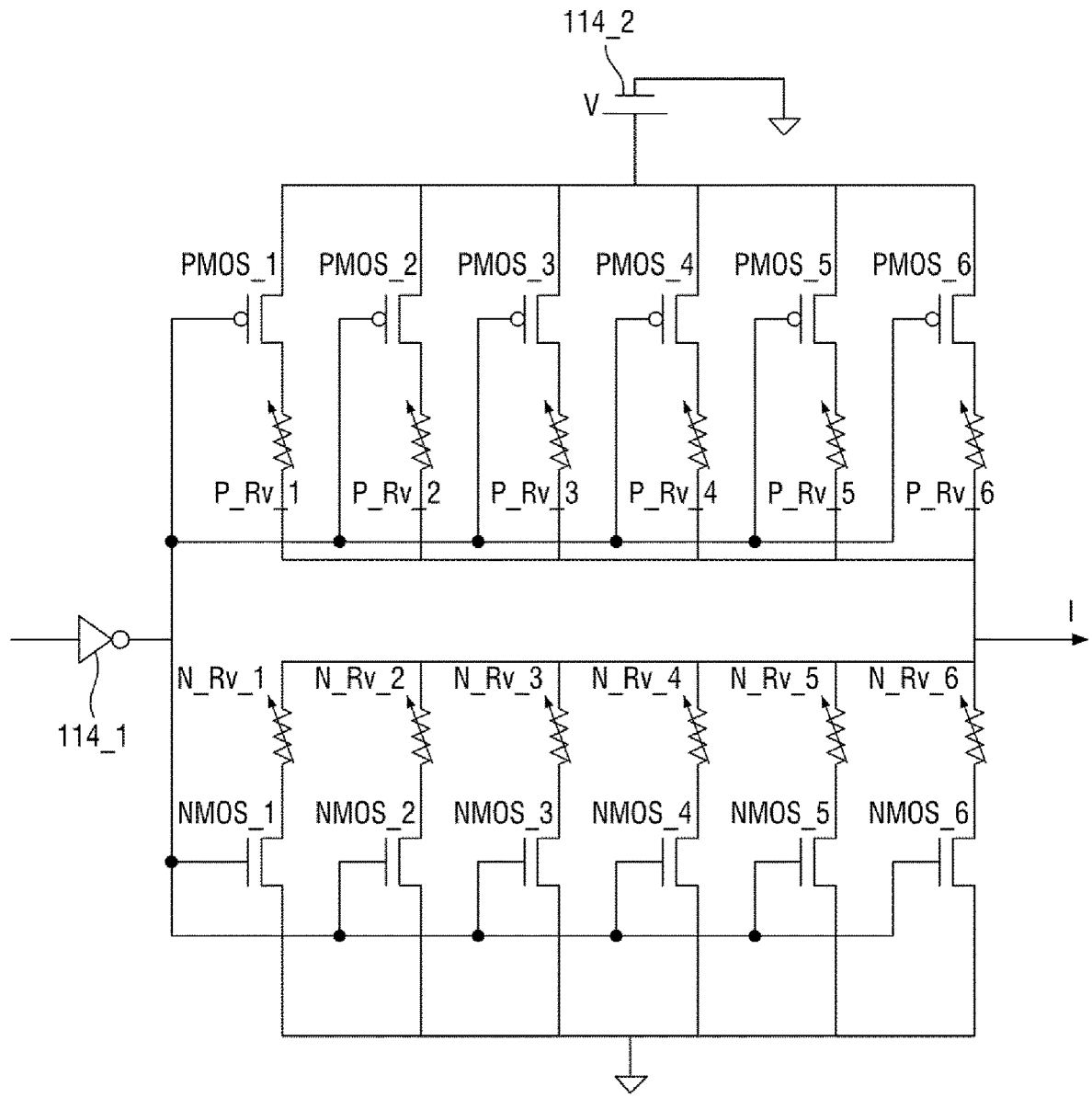
FIG. 15 is a circuit diagram illustrating one possible structure for the current source array according to embodiments of the inventive concept.

FIG. 15 illustrates the another possible structure for the current source array 114 according to embodiments of the inventive concept.

The current source array 114 of FIG. 15 may include first, second, third, fourth, fifth, and sixth P-type transistors PMOS_1, PMOS_2, PMOS_3, PMOS_4, PMOS_5, and PMOS_6 and first, second, third, fourth, fifth, and sixth N-type transistors NMOS_1, NMOS_2, NMOS_3, NMOS_4, NMOS_5, and NMOS_6, but unlike the current source array 114 of FIG. 6, may not include the first, second, third, fourth, fifth, and sixth P switches P_SW_1, P_SW_2, P_SW_3, P_SW_4, P_SW_5, and P_SW_6, which are connected in series to the first, second, third, fourth, fifth, and sixth P-type transistors PMOS_1, PMOS_2, PMOS_3, PMOS_4, PMOS_5, and PMOS_6, respectively, and the first, second, third, fourth, fifth, and sixth N switches N_SW_1, N_SW_2, N_SW_3, N_SW_4, N_SW_5, and N_SW_6, which are connected in series to the first, second, third, fourth, fifth, and sixth N-type transistors NMOS_1, NMOS_2, NMOS_3, NMOS_4, NMOS_5, and NMOS_6, respectively.

The current source array 114 of FIG. 15 may further include first, second, third, fourth, fifth, and sixth P variable resistors P_Rv_1, P_Rv_2, P_Rv_3, P_Rv_4, P_Rv_5, and P_Rv_6, which are connected between the first, second, third, fourth, fifth, and sixth P-type transistors PMOS_1, PMOS_2, PMOS_3, PMOS_4, PMOS_5, and PMOS_6, respectively, and an output node, and first, second, third, fourth, fifth, and sixth N variable resistors P N_Rv_1, N_Rv_2, N_Rv_3, N_Rv_4, N_Rv_5, and N_Rv_6, which are connected between the first, second, third, fourth, fifth, and sixth N-type transistors NMOS_1, NMOS_2, NMOS_3, NMOS_4, NMOS_5, and NMOS_6, respectively, and the output node.

Figure 16:
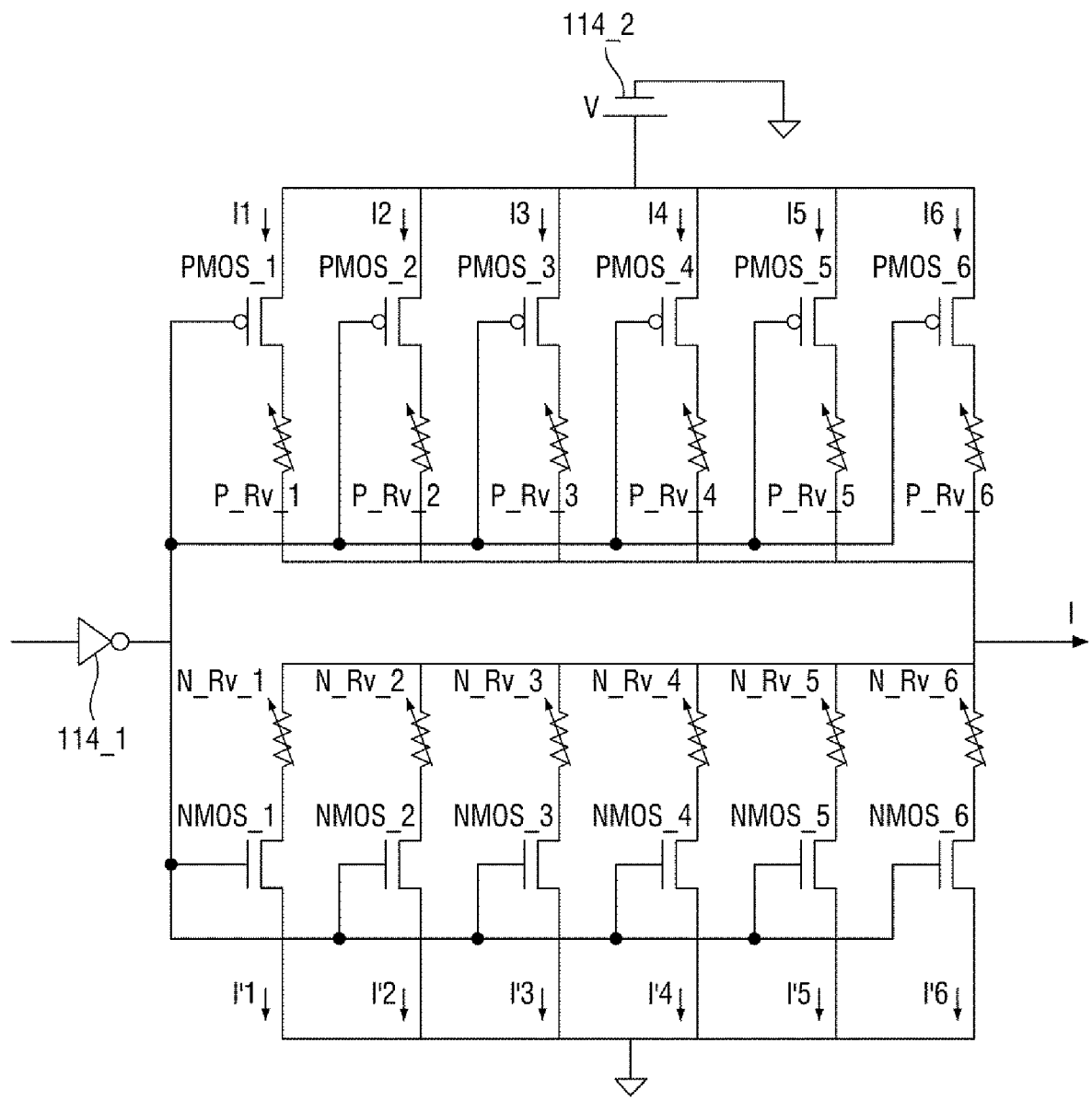
FIGS. 16, 17 and 18 are respective diagrams further illustrating the operation of the current source array and current controller of FIG. 15.
Figure 17:
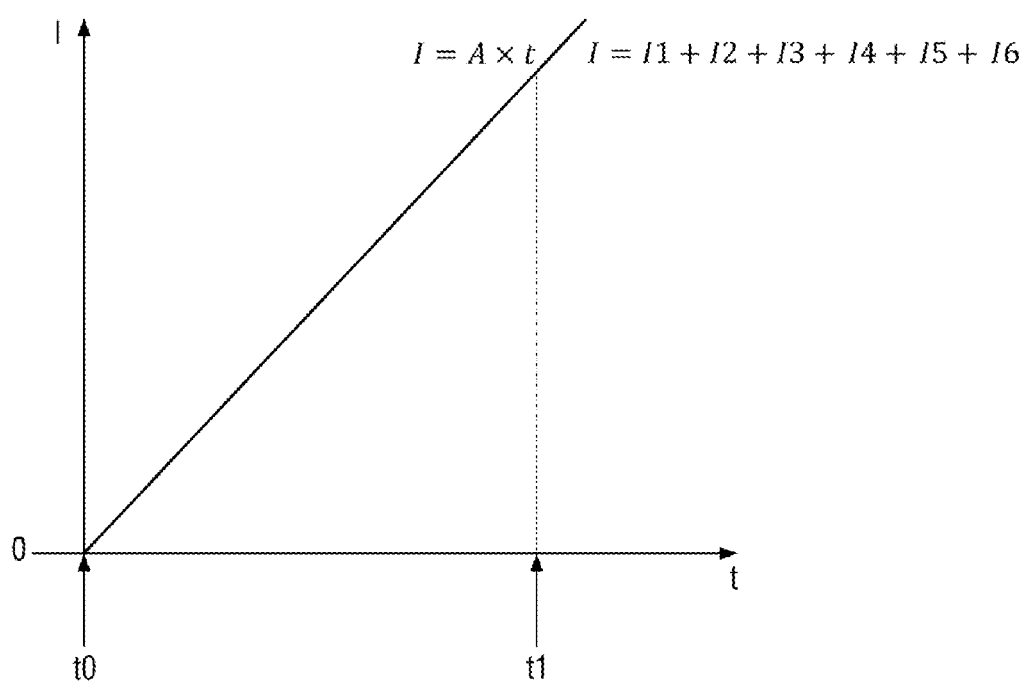
Figure 18:
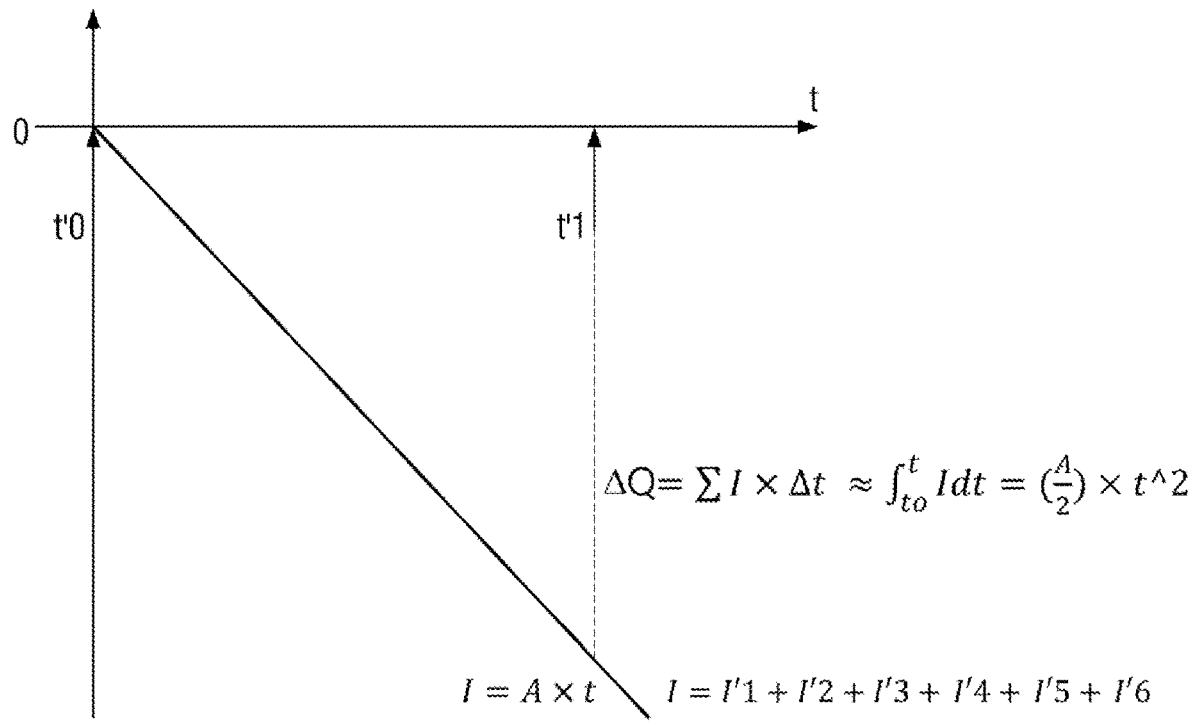

FIGS. 16, 17 and 18 respectively illustrate operation(s) of the current source array 114 of FIG. 15 according to embodiments of the inventive concept.

Referring to FIGS. 16 and 17—at a time t0, a signal with a value of "1" is transmitted to an inverter 114_1 and may be assumed to be the beginning of a BMC rising edge. The value of "1" may be converted into a value of "0" by the inverter 114_1, and the value of "0" may arrive at the gates of the first, second, third, fourth, fifth, and sixth P-type transistors PMOS_1, PMOS_2, PMOS_3, PMOS_4, PMOS_5, and PMOS_6. Thus, a current I during a period [t0, t1] may be I1+I2+I3+I4+I5+I6.

The resistances of the first, second, third, fourth, fifth, and sixth P variable resistors P_Rv_1, P_Rv_2, P_Rv_3, P_Rv_4, P_Rv_5, and P_Rv_6 may be large so that currents I1, I2, I3, I4, I5, and I6 at the time t0 can approach zero. When resistance decreases during a period [t0, t1], the current I may satisfy Equation (9):

$$I = A \times t (A>0) \qquad (9).$$

If the current I satisfies Equation (9), an amount |I| of the current I may increase with time, in the form of a straight line.

Thus, a charge variation ΔQ, which may affect an encoded signal from a drive circuit 113, may be as indicated by Equation (10):

$$\Delta Q = \sum I \times \Delta t \approx \int_{t_0}^{t} I dt = \left(\frac{A}{2}\right) \times t^2 (A > 0). \qquad (10)$$

According to Equation (10), the charge variation ΔQ may increase with time, in the form of a quadratic curve.

The charge variation ΔQ of FIG. 17 increases in the form of a quadratic curve, whereas the charge variation ΔQ of FIG. 11 increases in the form of a straight line. Thus, in the embodiment of FIG. 17, like in the previous embodiments, the coverage for the capacitor "cReceiver" 231 of the power supply device 200 can be widened.

Referring to FIGS. 16 and 18, at time C0 when a signal with a value of "0" is transmitted to the inverter 114_1 and may be assumed to be the beginning of a BMC rising edge. The value is of "0" may be converted into a value of "1" by the inverter 114_1, and the value of "1" may arrive at the gates of the first, second, third, fourth, fifth, and sixth N-type transistors NMOS_1, NMOS_2, NMOS_3, NMOS_4, NMOS_5, and NMOS_6. Thus, the current I during a period [t'0, t'1] may be I'1+I'2+I'3+I'4+I'5+I'6.

The resistances of the first, second, third, fourth, fifth, and sixth N variable resistors N_Rv_1, N_Rv_2, N_Rv_3, N_Rv_4, N_Rv_5, and N_Rv_6 may be large so that currents I'1, I'2, I'3, I'4, I'5, and I'6 at the time t0 can approach zero. When resistance decreases during a period [t'0, t'1], the current I may satisfy Equation (11):

$$I = A \times t \quad (A < 0) \qquad (11).$$

If the current I satisfies Equation (11), an amount |I| of the current I may increase with time, in the form of a straight line.

Thus, the charge variation ΔQ, which may affect the encoded signal from the drive circuit 113, may be as indicated by Equation (12):

$$\Delta Q = \sum I \times \Delta t \approx \int_{t'_0}^{t} I \, dt = \left(\frac{A}{2}\right) \times t^2 \quad (A < 0). \qquad (12)$$

According to Equation (12), the charge variation ΔQ may increase with time, in the form of a quadratic curve.

The charge variation ΔQ of FIG. 18 increases in the form of a quadratic curve, whereas the charge variation ΔQ of FIG. 11 increases in the form of a straight line. Thus, in the embodiment of FIG. 18, like in the previous embodiments, the coverage for the capacitor "cReceiver" 231 of the power supply device 200 can be widened.

Those skilled in the art will appreciate that many variations and modifications may be made to the foregoing, illustrative embodiments without substantially departing from the scope of the inventive concept as defined by the following claims.

What is claimed is:

1. A transmitter circuit comprising:
   a drive circuit disposed in a first electronic device and configured to generate a setting signal and transmit the setting signal via a channel from the first electronic device to a second electronic device connected to the channel;
   a current source array configured to provide a current signal to the drive circuit; and
   a current controller configured to control the current source array, wherein the current signal increases over a period extending from a first edge of the setting signal to a subsequent second edge of the setting signal.

2. The transmitter circuit of claim 1, wherein the channel is further connected to a power source providing a power signal.

3. The transmitter circuit of claim 1, wherein the setting signal is a biphase mark code setting signal.

4. The transmitter circuit of claim 1, wherein the current source array includes a first transistor connected to a power supply voltage, and a second transistor connected to ground.

5. The transmitter circuit of claim 4, wherein the current source array further includes:
   a first switch controlled by the current controller and connecting the first transistor to the power supply voltage;
   a second switch controlled by the current controller and connecting the second transistor to ground;
   a third switch controlled by the current controller and connected to the power supply voltage in series with a third transistor between an output node and the power supply voltage; and
   a fourth switch controlled by the current controller and connected to ground in series with a fourth transistor between the output node and ground.

6. The transmitter circuit of claim 4, wherein the current source array further includes:
   a first variable resistor connected to the power supply voltage via the first transistor and having a resistance controlled by the current controller; and
   a second variable resistor connected to ground via the second transistor and having a resistance controlled by the current controller.

7. The transmitter circuit of claim 2, wherein the current source array includes:
   a first switch, a second switch, a third switch and a fourth switch respectively controlled by the current controller;
   a first transistor connected to a power supply voltage via the first switch;
   a second transistor connected to ground via the second switch;
   a third transistor connected to the power supply voltage via the third switch in parallel with the first transistor between an output node and the power supply voltage; and
   a fourth transistor connected to ground via the fourth switch and in parallel with the second transistor between the output node and a ground source.

8. The transmitter circuit of claim 7, wherein the current controller operates the first switch and the third switch at different times, and operates the second switch and the fourth switch at different times.

9. The transmitter circuit of claim 1, wherein the current source array includes:
   a first variable resistor and a second variable resistor respectively controller controlled by the current controller;
   a first transistor connected to an output node via the first variable resistor; and
   a second transistor connected to the output node via the second variable resistor.

10. The transmitter circuit of claim 1, wherein the drive circuit receives a clock signal, a data signal, and the current signal, and encodes the setting signal in response to the clock signal, the data signal, and the current signal.

11. The transmitter circuit of claim 10, wherein the current signal increases linearly over the period extending from the first edge of the setting signal to the subsequent second edge of the setting signal.

12. The transmitter circuit of claim 1, wherein the first edge is a rising edge, and the subsequent second edge is a falling edge.

13. A data transmission method comprising:
connecting a first electronic device including a drive circuit and a second electronic device via a channel;
providing a clock signal and a data signal to the drive circuit;
increasing a current signal provided by the drive circuit over a period extending from a first edge of a setting signal to a beginning of a subsequent second edge of the setting signal;
encoding the data signal as the setting signal by reflecting the current signal and the clock signal; and
transmitting the setting signal from the first electronic device to the second electronic device via the channel.

14. The data transmission method of claim 13, wherein the setting signal includes a biphase mark code related to power provided by the second electronic device to the first electronic device.

15. The data transmission method of claim 14, wherein the increasing of the current signal is performed by a current source array and a current controller, and
the current source array includes:
a first switch, a second switch, a third switch and a fourth switch respectively controlled by the current controller;
a first transistor connected to a power supply voltage via the first switch;
a second transistor connected to ground via the second switch;
a third transistor connected to the power supply voltage via the third switch in parallel with the first transistor between an output node and the power supply voltage; and
a fourth transistor connected to ground via the fourth switch in parallel with the second transistor between the output node and a ground source.

16. The data transmission method of claim 15, wherein the increasing of the current signal includes:
closing, by operation of the current controller, the first switch and the third switch at different times; and
closing, by operation of the current controller, the second switch and fourth switch at different times.

17. The data transmission method of claim 14, wherein the increasing of the current signal is performed by a current source array and a current controller, and
the current source array includes at least one variable resistor.

18. The data transmission method of claim 13, wherein the increasing of the current signal is performed by a current source array and a current controller, and
the current source array includes:
a first switch, a second switch, a third switch and a fourth switch respectively controlled by the current controller;
a first transistor connected to a power supply voltage via the first switch;
a second transistor connected to ground via the second switch;
a third transistor connected to the power supply voltage via the third switch in parallel with the first transistor between an output node and the power supply voltage; and
a fourth transistor connected to ground via the fourth switch in parallel with the second transistor between the output node and a ground source.

19. An electronic system comprising:
a power source device configured to provide power to a power consumption device via a cable, wherein the power consumption device includes a power delivery controller controlling operation of a power source; and
the power delivery controller including:
a current source array connected to the cable and generating a current signal; and
a drive circuit configured to receive the current signal, encode a setting signal related to power provided to the power consumption device from the power source device, and
transmit the encoded setting signal via a channel provided by the cable,
wherein the current signal is gradually increased over a period extending from a first edge of the setting signal to a second edge of the setting signal.

20. The electronic system of claim 19, wherein the setting signal includes a biphase mark code related to the power provided to the power consumption device from the power source device.

* * * * *